Nov. 12, 1968     K. KUPFERBERG     3,411,014
REGULATED POWER SUPPLIES COMBINED IN SERIES VOLTAGE
AIDING AND SHUNT CURRENT AIDING COMBINATIONS
Original Filed March 15, 1962
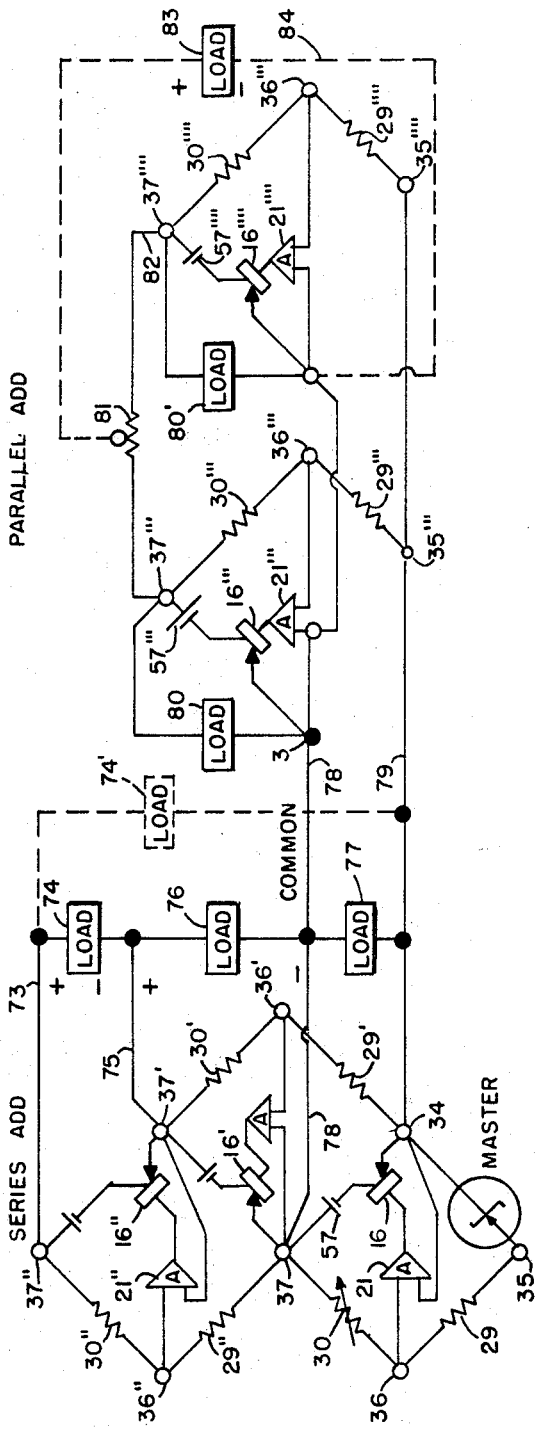
INVENTOR.
KENNETH KUPFERBERG
BY
*Alfred W. Barber*
ATTORNEY United States Patent Office 3,411,014
Patented Nov. 12, 1968

3,411,014
REGULATED POWER SUPPLIES COMBINED IN SERIES VOLTAGE AIDING AND SHUNT CURRENT AIDING COMBINATIONS
Kenneth Kupferberg, Flushing, N.Y., assignor to Forbro Design Corp., New York, N.Y., a corporation of New York
Original application Mar. 15, 1962, Ser. No. 179,851, now Patent No. 3,275,927, dated Sept. 27, 1966. Divided and this application June 16, 1966, Ser. No. 558,015
5 Claims. (Cl. 307—24)

ABSTRACT OF THE DISCLOSURE

Bridge controlled multiple voltage and current regulated power supplies are combined to provide higher voltages and higher currents in master-slave relationship wherein the output voltages of two or more voltage regulated power supplies are added together to supply one or more loads and the output currents of two or more current regulated power supplies are added together to supply a further load or loads.

---

This is a division of the application filed Mar. 15, 1962 bearing Ser. No. 179,851 now Patent No. 3,275,927.

Many circuits have been used for current or voltage regulation of power supplies. One of the most useful and versatile regulation system utilizes a bridge circuit comprising a fixed reference voltage arm, a fixed resistor arm, a variable resistor arm and an arm embracing a source of voltage and the load circuit. An error amplifier connected across one diagonal of the bridge provides a control signal to a pass element connected between the source of voltage and the load circuit to control the load voltage in accordance with the setting of the variable resistor. This circuit is shown and described in United States Patent No. 3,028,538. It has been found that this circuit is not only a superior circuit for voltage regulated power supplies but also that it may be utilized in many unique combinations of multiple power supplies.

It has been found that while the basic circuit is ordinarily utilized by varying the voltage control resistor to vary the regulated voltage, that the circuit may be adapted to be voltage controlled. This discovery leads to many unique combinations. For example two regulated power supplies may be operated together with one replacing the reference voltage of the other and thus providing a circuit in which the second power supply is partly controlled by the first. The second power supply may be operated to provide a voltage equal to the first and of opposite polarity with respect to a common point or the second supply may be made to supply a proportional voltage. Another combination provides a constant current with a regulated supply controlling a second voltage regulated supply wherein various voltage combinations of controlling and controlled supplies may be used. Further combinations utilize a master supply with controlled or slave supplies in multiple series and parallel combinations.

Accordingly one object of the present invention is to provide methods of and means for operating multiple regulated power supplies in various interdependent relationships.

Still another object is to provide two or more regulated power supplies in which one of these power supplies controls the others by means of a transmitted voltage.

A further object is to provide constant current from regulated sources utilizing one controlling supply and one or more controlled supplies.

These and other objects of the present invention will be apparent from the detailed description of the invention given in connection with the description of the various figures of the drawing.

The figure of the drawing is a schematic circuit diagram of a bridge circuit voltage regulated power supply connected to control a plurality of series adding regulated power supplies and a plurality of common negative or parallel adding regulated power supplies.

The bridge regulated power supply shown in the drawing operating as master control utilizes the bridge having terminals 34–35–36–37. This master supply provides the reference voltage for the slave supply connected to bridge terminals 34–37–37′–36′ which in turn provides reference voltage to a second slave supply connected to bridge terminals 37–36″–37″–37′. The master supply also supplies reference voltage to the slave supply connected to bridge terminals 3–37‴–36‴–35‴ and the slave supply connected to bridge terminals 37⁗–36⁗–35⁗.

Thus, the drawing shows a master supply with a plurality of series connected slave supplies and a plurality of parallel connected slave supplies. The master supply, the control bridge and other elements of which are shown with unprimed number designations is connected to the first series slave supply designated with single primed numbers as the reference voltage and to the first common negative or parallel slave supply designated with triple primed corresponding numbers as the reference voltage thereof. The first series connected slave supply is connected to a second series slave supply as the reference voltage thereof and designated with corresponding double primed numbers. The first series slave supply is connected to load 76 over leads 75 and 78 while the second series slave supply is connected to load 74 over leads 73 and 75, and the master supply is connected to load 77. Thus starting with common lead 78 as the negative side of the series circuit, loads and voltage supplies are added in a positive direction (lead 73) in a manner which can be extended to any reasonable number of co-acting supplies. While independent loads are shown, a common load as shown at 74′ connected by dotted lines from lead 79 to lead 73 may be supplied or a combination of independent, series or parallel connected loads.

In the parallel chain the first slave supply designated by the triple primed corresponding numbers is connected to a second parallel slave as reference voltage and designated by quadruple primed numbers. These two slave supplies may supply independent loads 80 and 80′ respectively or they may operate in parallel feeding load 83 over lead 84 with the use of a load equalizing resistor 81 connected between the supplies. These parallel connected slave supplies can also be extended to any reasonable number of parallel connected supplies with independent common negative loads or a common load in circuits corresponding to those of the first two parallel connected supplies. Thus, the series connected supplies connected to load 74′ are in series voltage aiding mode while the parallel connected supplies connected to load 83 are in shunt current aiding mode.

While one form of the present invention has been shown and described, many variations will be apparent to those skilled in the art and within the spirit and scope of the invention as set forth in particular in the appended claims.

What is claimed is:
1. In a system of interconnected regulated power supplies, the combination of, a plurality of regulated power supplies each of which utilizes a bridge circuit equivalent to a four arm bridge in which a first arm comprises a source of reference voltage, a second arm comprises a reference resistor for establishing a reference current in the four arms of the bridge, the third arm com- prises a control resistor for determining output across the fourth arm, and a fourth arm comprising a source of unregulated voltage and a signal responsive current control means shunted by a load, and a control amplifier including input and output means connected with its input across a diagonal of said bridge and its output connected to control said current control means, wherein at least two of said power supplies are connected with outputs in series voltage aiding relationship and at least two of said power supplies are connected with outputs in shunt current aiding relationship.

2. A system of regulated power supplies as set forth in claim 1, and including independent load circuits connected to said series aiding and parallel aiding power supplies.

3. A system of regulated power supplies as set forth in claim 1, wherein the reference voltage arms of said parallel aiding power supplies are connected in parallel.

4. A system of regulated power supplies as set forth in claim 1, wherein the reference voltage arms of said series aiding power supplies are connected series aiding.

5. A system of regulated power supplies as set forth in claim 1, wherein the reference arms of said parallel aiding power supplies are connected in parallel and the reference voltage arms of said series aiding power supplies are connected series aiding.

References Cited
UNITED STATES PATENTS

| | | | |
|---|---|---|---|
| 2,773,200 | 12/1956 | Guggi | 323—22 |
| 2,815,480 | 12/1957 | Ruge | 323—75 |

LEE T. HIX, *Primary Examiner.*

A. D. PELLINEN, *Assistant Examiner.*